United States Patent [19]
Hunting

[11] 4,043,195
[45] Aug. 23, 1977

[54] DIGITAL THERMODYNAMIC FLOW-METER

[76] Inventor: Curtis J. Hunting, 1808 E. Altenda Drive, Altadena, Calif. 91001

[21] Appl. No.: 552,500

[22] Filed: Mar. 13, 1975

[51] Int. Cl.² ............................................. G01F 1/68
[52] U.S. Cl. ..................................................... 73/204
[58] Field of Search ......................................... 73/204

[56] References Cited

U.S. PATENT DOCUMENTS

| | | | |
|---|---|---|---|
| 2,972,885 | 2/1961 | Laub | 73/204 |
| 3,085,431 | 4/1963 | Yerman et al. | 73/204 |
| 3,485,099 | 12/1969 | Collins | 73/204 |
| 3,603,147 | 9/1971 | Dorman | 73/204 |
| 3,683,692 | 8/1972 | Lafitte | 73/204 |
| 3,803,913 | 4/1974 | Tracer | 73/204 |
| 3,869,914 | 3/1975 | Koehler | 73/190 |

FOREIGN PATENT DOCUMENTS

| | | | |
|---|---|---|---|
| 1,224,069 | 9/1966 | Germany | 73/204 |

OTHER PUBLICATIONS

Hoffmann et al., "Analysis of the Thermal Flowmeter Operating from a Pulsed-Heat Injection Source", in Journal of Physics & Sci. Inst., 1972, vol. 5.

*Primary Examiner*—Herbert Goldstein
*Attorney, Agent, or Firm*—Nilsson, Robbins, Dalgarn & Berliner

[57] ABSTRACT

An apparatus is disclosed for measuring instantaneous rate of flow and total flow of a fluid. The data are obtained by measuring the quantity of energy necessary to replace an equivalent amount of heat dissipated from a temperature-sensitive transducer disposed in the path of the fluid flow. An error signal, resulting from a transducer impedence change due to a differential temperature, induced by fluid flow, is placed in digital form and fed back to the transducer in a closed feedback loop configuration. The feedback signal is in the form of discrete power pluses. The number of such pulses is proportional to the heat removed from the transducer by the flow and thus is proportional to the fluid flow rate. The output pulses are counted and displayed in associated digital equipment.

5 Claims, 14 Drawing Figures

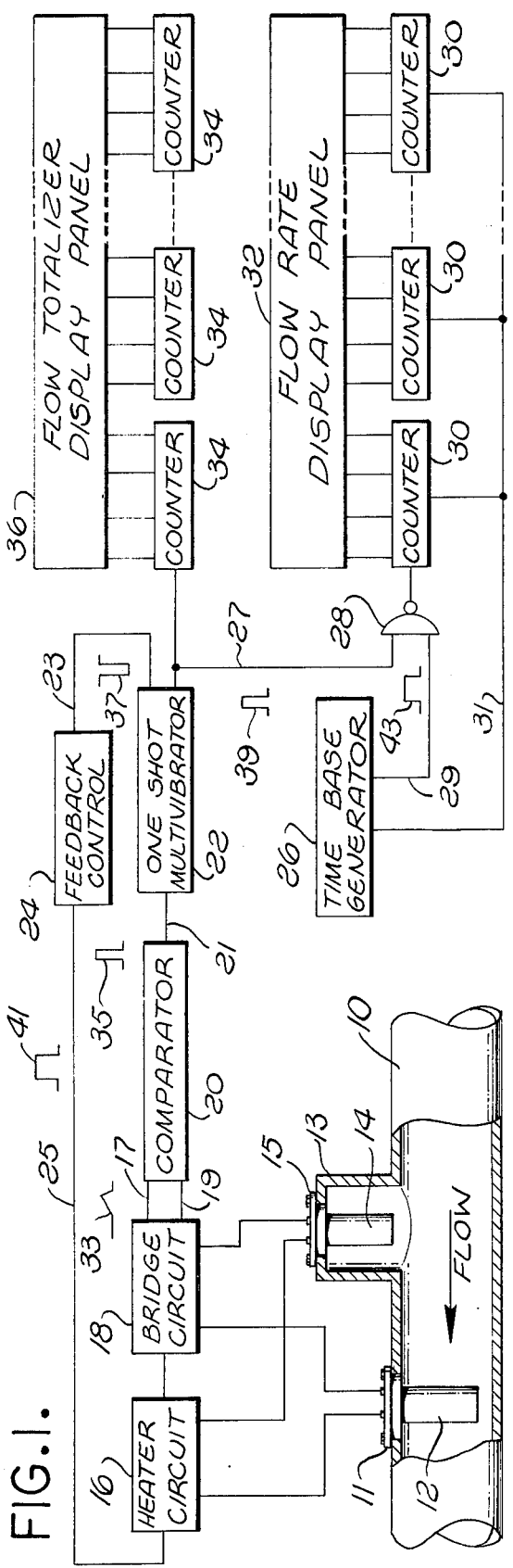
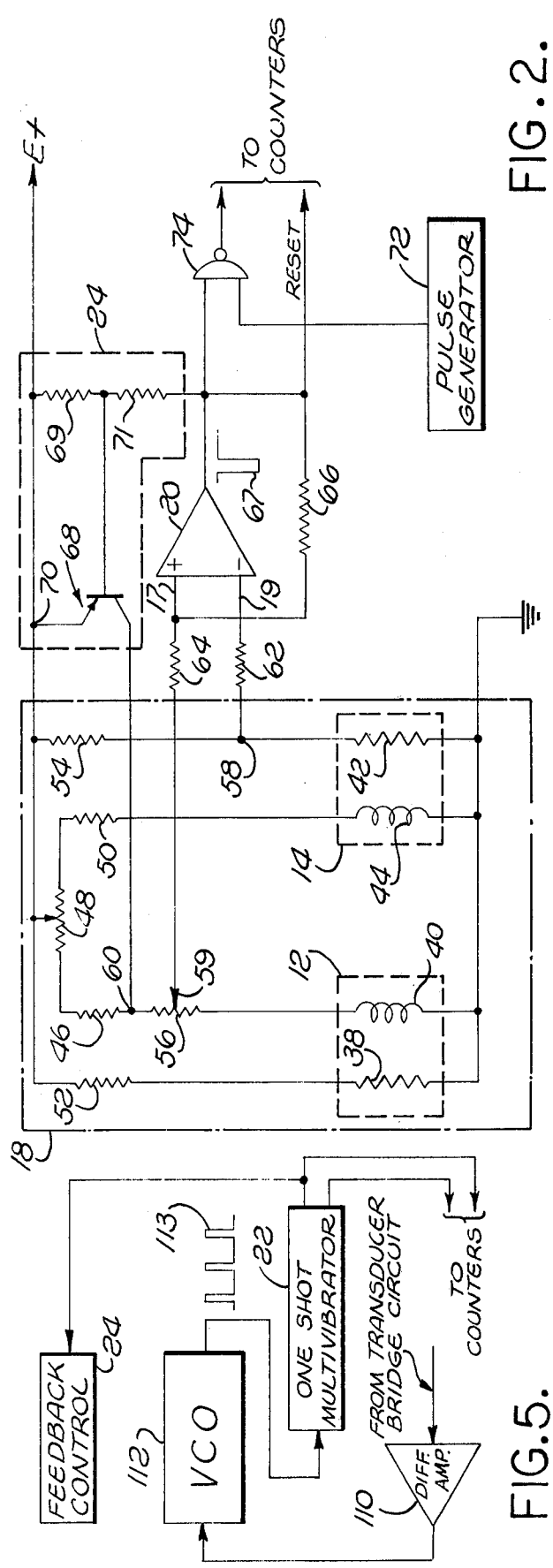

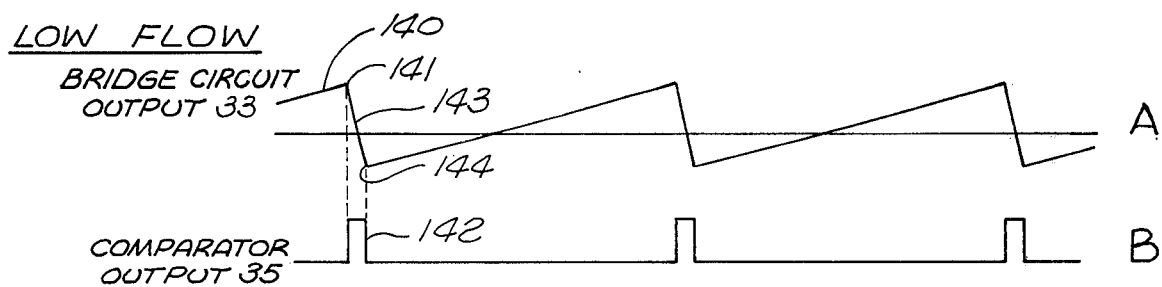
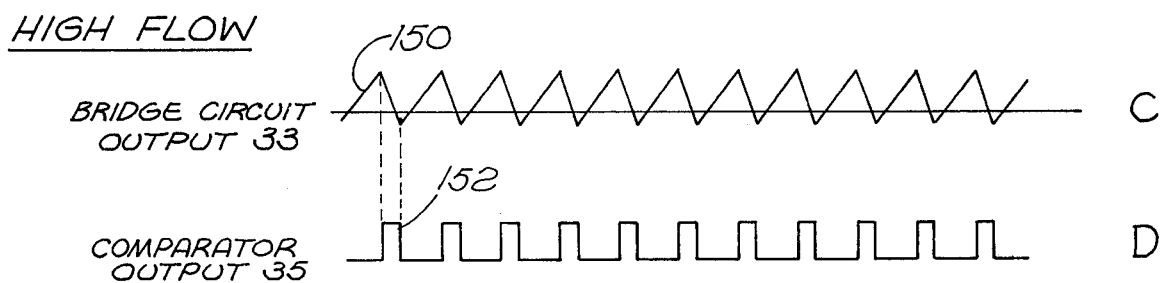
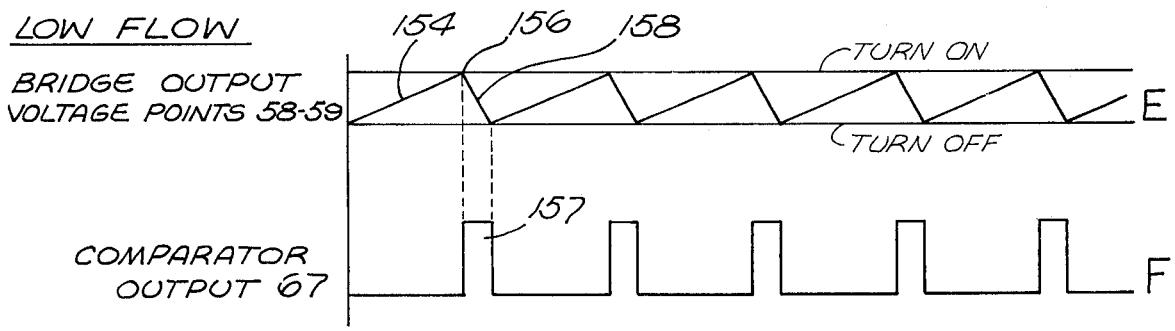
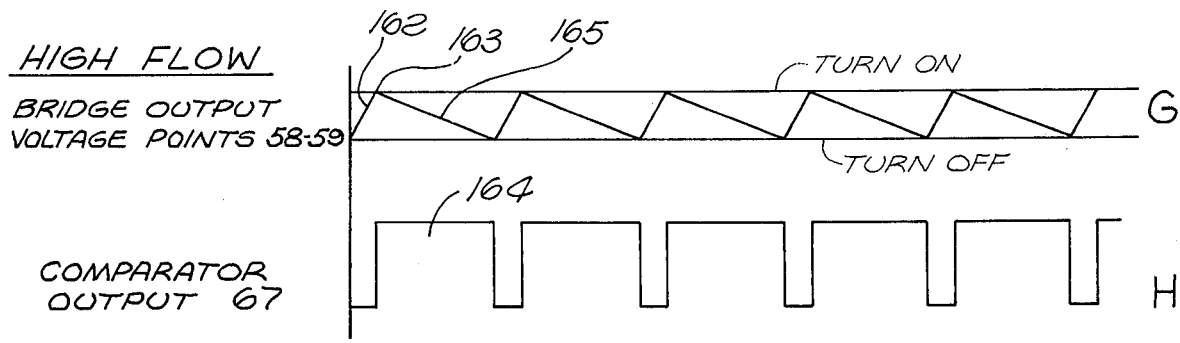
FIG. 7.

DIGITAL THERMODYNAMIC FLOW-METER

BACKGROUND OF THE INVENTION

1. Field of the Invention

This invention relates to flow meters and particularly to a temperature-sensitive flow-meter capable of measuring and digitally counting the instantaneous flow rate and cumulative flow rate of fluid.

2. Prior Art

In modern industrial technology, pipe lines are extensively used to convey a wide variety of fluids. When these conveyance systems are computer controlled, the need arises for accurate digital measurements of the fluid flow rates. Such data are used not only to monitor flow, but as feedback information for the digital computer controlling the flow.

The use of a thermal flow-meter is an effective approach to determine fluid flow rates. These devices employ thermally responsive transducers which provide analog signals in accordance with the rate of flow. Known prior art thermal flow-meters directly produce only analog non-linear varying output signals. Illustrative of such an approach is the flow-meter disclosed in U.S. Pat. No. 3,372,590. As is therein disclosed, a transducer comprising a thermistor is disposed in the path of fluid flowing through a conduit. Constant power is applied to the thermistor maintaining it at a fixed temperature above that of the fluid. The fluid flowing past the thermistor will tend to cool it and thereby induce an impedance change.

Other prior art known at the present time consist of U.S. Pat. Nos. 3,220,255 and 2,947,938; an article entitled "Mass Flow Measurement" by Robert Siev in *Instrument & Control Systems,* June 1960, page 966; and an article entitled "The Hot Wire Anemoneter" by O. C. Wolf in the same journal on page 960.

Generally, such thermal flow-meters will measure mass flow rates with speeds and accuracies sufficient for some applications, such as coarse monitoring of simple conveyance systems. However, none of the known prior art devices has produced directly a truly satisfactory digital output.

The apparatus of the present invention produces a digital output proportional to fluid mass flow rate. The advantages of direct digital measurement are numerous. The obvious advantage is that the digital information can be applied directly to and be processed by computers. An additional advantage is that no moving parts are utilized in the flow-meter. In many industrial applications the lack of moving parts can be very critical. A further advantage is that the design of the flow-meter provides inherent protection of the sensing elements against thermal damage. Another advantage is that the signal readout is not subject to a "reading error" as in analog instruments. Still another advantage is the insensitivity to noise.

The present invention can achieve overall accuracies in the order of 0.5% while providing a linear response over a broad range of fluid flow. Moreover, both a linear relation between the flow rate and the electrical power to the transducers, and a uniform sensitivity for flow rates measured over a broad range can be achieved.

SUMMARY OF THE INVENTION

The present invention is a digital flow-meter that measures and counts the flow and flow rate. The fluid the flow rate of which is to be measured is passed into contact with first and second thermally sensitive transducers spaced apart along the fluid flow path. The first transducer is disposed directly in the fluid flow path while the second transducer is shielded from the flow path in such a manner as to be insensitive to the flow of the fluid but can sense the temperature of the fluid. Each transducer comprises a stable heating element in proximity to a temperature sensitive resistor. These heating elements maintain their associated temperature-sensitive resistors at a fixed temperature substantially above the maximum expected ambient temperature of the fluid medium. As the fluid flows past the first transducer, a transfer of heat occurs from the transducer to the fluid thereby resulting in an increase or decrease in the resistor impedance, dependent upon whether negative or positive temperature coefficient material is used.

The temperature-sensitive resistors of both the first and second transducer form adjacent legs of a balanced bridge circuit so that the resultant impedance change of the first transducer causes an imbalance of the bridge and thereby produced an error signal at the bridge output. The errow signal is used to initiate the generation of a discrete power pulse or pulses which are applied to the first transducer to heat the same. Fluid flow rate is indicated by that quantity of electrical power, applied to the first transducer, necessary to return the bridge to a balanced condition.

The electrical power necessary to maintain the resistor of the first transducer at a constant temperature, and thus at a constant impedance, is derived responsive to the error or imbalance signal at the bridge output. This error signal is applied to the input of a comparator. Upon the input reaching a predetermined level, the comparator output changes from one state to another. The instant the comparator output shifts, a "one shot" (monostable) multivibrator is triggered and provides an output pulse of precision time duration. The output pulse of the "one shot" multivibrator is fed to a feedback control circuit which includes a switching transistor. When energized by the output pulse of the "one shot" multivibrator, the transistor provides a discrete precision power pulse to the precision stable heating elements of the transducers. In this manner, a train of precision power pulses is generated. The heating elements which form adjacent legs of a second balanced bridge, supply enough heat by way of the pulse train of constant power pulses to return the resistance of their associated temperature sensitive resistors to a balanced condition. In this manner the applied power is varied automatically and digitally by the electronic control circuit which responds to the varying flow rates. The direction of power change to the heating elements is such as to restore the bridge to balance, thus providing a closed loop system.

The positive to negative pulse outputs are fed to digital counting circuits. Display equipment having a compatible interface with the counting circuits numerically provide the instantaneous and comulative output data.

BRIEF DESCRIPTION OF THE DRAWINGS

A better understanding of the invention may be had from a consideration of the following detailed description, taken in conjunction with the accompanying drawings, in which:

FIG. 1 is a simplified block diagram of a digital flow-meter constructed in accordance with the invention, including the digital readout instrumentation;

FIG. 2 is a partial schematic of another embodiment of the digital flow-meter of FIG. 1;

FIG. 5 is a partial block diagram of still another embodiment of the digital flow-meter for application with temperature-sensitive transducers having long thermal time constants;

FIGS. 7 A-H shows wave forms of FIGS. 1 & 2.

DESCRIPTION OF THE PREFERRED EMBODIMENTS

Figure 4:
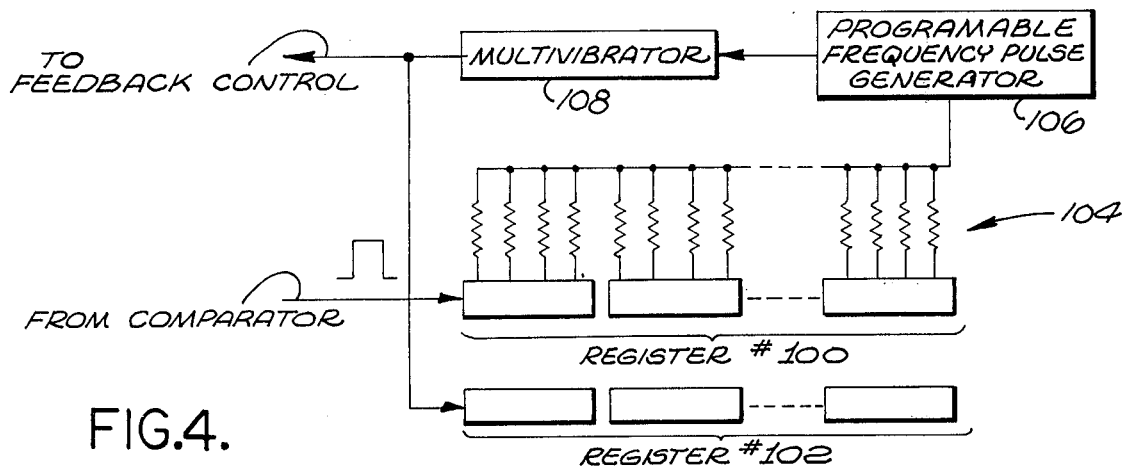
FIG. 4 is a partial block diagram of yet another embodiment of the digital flow-meter.

Referring to the simplified block diagram of FIG. 1, a digital flow-meter, in accordance with the present invention, is a closed-loop feedback system which measures the flow rate of a fluid and provides a digital readout representative thereof. By fluid is meant both a liquid and/or a gas substance. The fluid the flow rate of which is to be measured is introduced into a conduit 10. It will be understood by those skilled in the art that the present invention may be used in closed or open systems. For simplicity of illustration and clarity of description, a conduit containing the fluid will be described without intending or imparting a limitation to the invention as claimed. The conduit 10 is provided with an opening 11, and a plenum 13 having an opening 15. The plenum 13 is illustrated as an outwardly extending section of the conduit 10 but may be constructed in any fashion desired, internally or externally of the conduit 10, to provide a stagnant fluid around the transducer 14 positioned therein. Temperature-sensitive transducers 12, 14, are disposed in the conduit as shown. These transducers are inserted through the openings 11, 15 respectively, to be electrically heated to a fixed reference temperature. The temperature reference is maintained at all flow rates by means of an electrical bridge circuit 18 incorporating certain passive elements of transducers 12 and 14. Any temperature differential between the two tranducers 12, 14 unbalances the bridge circuits, producing an error voltage 33 across conductors 17 and 19. This error voltage which results from the fluid flow past the transducer 12 is applied to the input of a comparator 20. Upon reaching a predetermined value, the error voltage produces a level shift 35 at the output of comparator 20. The level shift signal 35 is applied through conductor 21 and triggers the one shot multivibrator 22 which produces output signals 37-39. The output signal 37 is a pulse having a precision time duration. The pulse 37 is applied through conductor 23 to a feedback control network 24. Although a one shot multivibrator has been disclosed, it will be recognized by those skilled in the art that any circuit capable of producing precision pulses having a known and predetermined duration may be employed. The network 24 provides a discrete power pulse 41 having predetermined power content. The power pulse 41 is applied through conductor 25 to the heater circuit 16 and from there to the transducer 12 to restore the heat therefrom by the fluid flow. By restoring the heat the bridge circuit is again balanced and the error signal 33 is returned to a point below the level at which the comparator produces the change of state (its quiescent level). At this point, the occurrence of events above described will be repeated as long as fluid flows past transducer 12. Thus a continuous train of power pulses 41 will be applied to the transducer 12, each pulse being generated responsive to an error signal as at 33. The number of pulses generated per unit of time will be proportional to the flow rate of the fluid past the transducer 12.

To obtain a readout of the flow rate, pulses from the multivibrator 22 are applied to a counter. Although the signal 37 may be used for counting purposes, the complementary signal output 39 is illustrated as being applied thereto. As will be recognized by those skilled in the art, the total (cumulative) mass flow of the fluid is indicated by counting each pulse 39 through use of the counter 34 and continuously applying the same to the flow totalizer display panel 36. At the same time, the pulses 39 of multivibrator 22 are fed through conductor 37 to nand gate 28 to measure instantaneous flow rate; that is, flow with respect to time. The nand gate 28 is controlled by a time base generator 26 or any suitable device that will direct the output pulses at the proper time into the counters 30. The time base 36 establishes the time periods during which pulse counting is performed by providing an enabling pulse 43 for the gate 28. As each pulse 39 is passed through the gate 28, the counter 30 advances one step. After each full count, that is, when the time increment during which flow is measured has expired, a signal pulse from the generator 26 resets the counters 30 to zero (cleared) and triggers the start of another measurement sequence.

The digital display 32 provides a numerical visual readout of each full count which is related to the instantaneous flow rate. It will be recognized by those skilled in the art that a "memory" is included in the display circuit. The memory holds the result of the completed count so that this result is displayed while the counters are reset to zero and the next count is made. At the end of the count, the new result is transferred into the memory and associated display circuit.

The schematic circuit diagram of FIG. 2 simply illustrates in greater detail the salient features of the flow-meter. It should be recognized that this embodiment is similar to that of FIG. 1, with the exception that the pulses generated by the comparator 20 are applied directly to the counter means instead of utilizing the multivibrator 22.

As is illustrated in FIG. 2, transducer 12 comprises temperature-sensitive resistor 38 in proximity to a heating element 40. Similarly, transducer 14 comprises a temperature-sensitive resistor 42 and a heating element 44.

Both temperature-sensitive resistors 38 and 42 may have either positive or negative temperature coefficients, however, for discussion purposes a negative temperature coefficient will be used; that is, their resistances decrease with an increase of temperature. The heat applied to resistors 38 and 42 is generated by their associated heating elements 40 and 44, respectively. These heating elements may comprise a coil, resistance film or any suitable device that would convert electrical energy to heat energy.

The heat circuit 16 consists of four legs formed by heating elements 40, heating element 44, fixed resistor 46 in series with adjustable resistor 48, and fixed resistor 50. When energized, resistors 46 and 40 connected to source E+ through balance potentiometer 48 used for zero adjust supply constant power to the heating coils. If desired, the constant power source may take the form of constant current generators. The heating elements 40 and 44 continously provide a source of heat to their associated temperature-sensitive resistors. The amount of heat supplied maintains the temperature-sensitive resistors 38 and 42 at a temperature level well above the ambient temperature of the fluid.

The transducers 12 and 14 are disposed to compensate for any temperature variation in the fluid during flow measurement. During such flow, temperature-sensitive resistor 38, operating at its elevated temperature, is positioned within the conduit so as to be in the direct path of the fluid flow and thereby be responsive to the fluid velocity. The temperature-sensitive resistor 42 is positioned in the fluid so that it will not lie in the direct flow path of the fluid, but will be exposed to the same fluid in a substantially stationary or stagnant condition. The temperature-sensitive resistor 42 may be characterized as a reference element and, as explained above, is kept at a constant temperature. This arrangement exposes both temperature-sensitive resistors 38 and 42 in transducers 12 and 14 to the same ambient or "background" conditions. By balancing bridge 18 at zero flow conditions, any change in resistance of temperature resistor 42 due to temperature changes of the fluid, will be "neutralized". Thus, an error voltage at the output of bridge 18 during fluid flow will be present only when a fluid movement or velocity influences the behavior of temperature-sensitive resistor 38. For optimum results, transducers 12 and 14 should be matched for temperature. From the foregoing, resistor 42 may be viewed as the reference and resistor 38 as the detector.

Bridge circuit 18 comprises the temperature-sensitive resistors 38 and 42, fixed resistors 52 and 54 and balancing potentiometer 56. Power source E+ is connected to the bridge circuit 18 at the junction between resistors 52 and 54. During quiescent conditions, that is, no fluid flow, the temperature of resistors 38 and 42 is the same and the bridge is balanced by potentiometer 56 to provide zero output or error signal at points 58-59 of the bridge circuit 28. Under fluid flow conditions, heat is conducted by the fluid away from resistor 38 causing its temperature to drop and its resistance to increase. The increase in resistance of resistor 38 unbalances the bridge 18 producing an error signal at points 58-59.

The error signal of bridge 18 measured at junctions 58 and 59 in FIG. 2, is applied to the comparator 20 through buffer (high impedance) resistors 62 and 64. The potentials measured with respect to ground at point 58 and point 59 are considered the comparator input and reference voltages, respectively. The comparator 20 may be any circuit responsive to a varying input signal which will produce an output level shift upon a predetermined variation in the input signal and, for example, may be either a differential amplifier or an operational amplifier. The characteristics of comparator 20 are such that the output is always one of two levels; low or high. For purposes of discussion herein, it is assumed that when the comparator 20 input voltage applied at the inverting input (−) is less than the reference voltage applied to the non-inverting input (+) the output is high, but when the input voltage is greater than the reference voltage the output is low. Thus, if the error voltage applied to the comparator 20 exceeds a threshold level of the reference voltage, the comparator output signal makes a transition from high to low. The setting of the threshold level can be critical. If it is set too low, noise pulses will be counted. For this reason, the output signal is fed back to the non-inverting input (+) through a feedback resistor 66 to stablize the comparator.

In FIG. 2, the output of the comparator 20 is applied to feedback control circuit 24. This feedback circuit 24 comprises a switching transistor 68 of the PNP type. The emitter of transistor 68 is connected directly to the common power supply, at point 70, and the collector is connected to junction 60 of the heater circuit 16. The base of the transistor 68 is connected to a junction point between biasing resistors 69 and 71 and thus transistor 68 is non-conducting in the quiescent condition. When the comparator output signal goes low, transistor 68 becomes conducting in a saturated state. When conducting, the transistor 68 applies power directly from source E+ to the heater element 40 thus raising the temperature of the detector resistor 38 and bringing the bridge 18 back into balance condition. Upon such occurring, the error voltage disappears and the comparator returns the transistor to its non-conducting state. Thus the transistor 68 operates as a switching means to apply power to the heater element responsive to the error signal from the bridge circuit 18. As an alternate switching scheme for feedback control 24, transistor 68 may be replaced by a silicon controlled rectifier (SCR) or other switch means.

In summary, the operation of the apparatus of the system illustrated in FIG. 2 will now be described. During zero fluid flow, the temperature-sensitive resistors of both transducers 12 and 14 are maintained at a constant impedance by means of their respective heating elements 40 and 44. In this quiescent state, bridge circuit 18 is balanced. The potential at junctions 58 and 59 of the bridge circuit 18 is adjusted by potentiometer 56 to provide the desired offset for proper operation of the comparator 20. Under these operating conditions, the output signal of the comparator 20 is in a high state. The transistor switch 68 at this time is nonconductive or open.

Once fluid flow is initiated, the temperature of the detect resistor 38 of transducer 12 decreases by the passage of fluid thereacross. As a consequence, the resistance of the detector resistor 38 increases with respect to the resistance of the reference resistor 42. This, as mentioned previously, causes an unbalance in the bridge circuit, with the potential at junction 58 increasing with respect to the potential at junction 59. The input voltage at the inverting input (−) to the compartor being less than the reference voltage, at the non-inverting input (+), causes the comparator output to go to a low state as shown in 67.

While the comparator 20 output is in a low state the switching transistor 68 is on, providing power to heating element 40 through junction 60 of bridge circuit 16. The amount of heat which is being lost or transferred by the detector resistor 38 to the fluid is replaced by the increase of power to the heating element 40. At the same time, the impedance of detector resistor 38 will decrease because of its negative temperature coefficient resulting in the restoration of the bridge circuit 18 to a balanced condition. Comparator 20 output is thus almost immediately brought back to its high state causing switching transistor 68 to be turned off. This cycle is repeated continually during the entire period of fluid flow.

The digital circuit required for counting the events and displaying the resulting count, includes pulse generator 72, gate 74 and a series of counters and readout displays (not shown) but illustrated in block diagram form in FIG. 1. The output signal of the comparator 20 going to a low state opens the gate 74 in response to the error signal at the comparator input. The number of pulses from generator 72 which are counted depend directly on the gating interval which is established by the time the comparator output remains in a low state. The resulting counts are displayed by suitable circuits, such as numerical readout devices, tapes, light-emitting diode matrices, etc.

Figure 3:
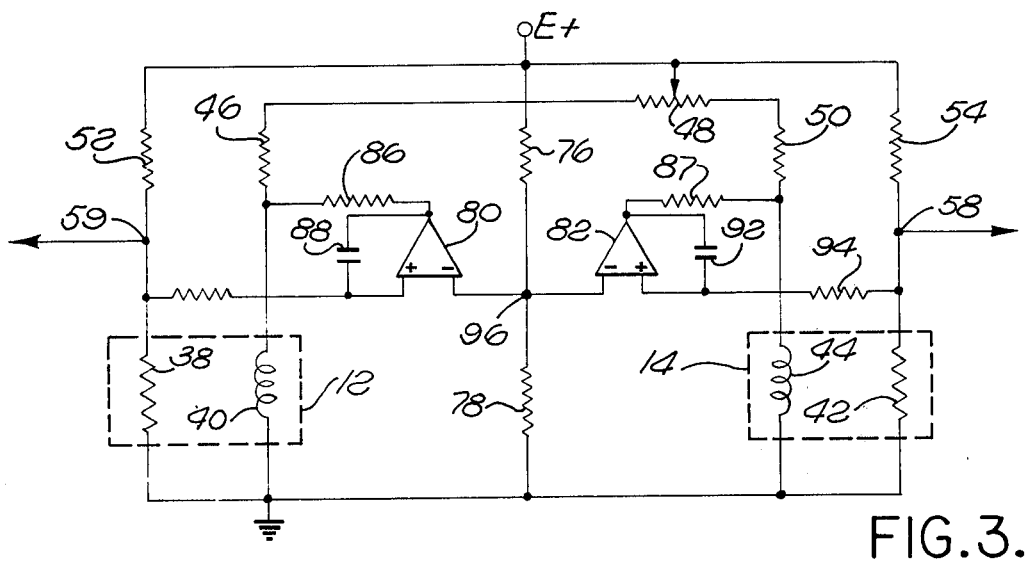
FIG. 3 is a schematic diagram, illustrating a temperature compensation network as may be applied to the invention.

In some instances, where unmatched transducers 12 and 14 have been utilized, it has been determined that means for obtaining the transducers in balance irrespective of changes therein when ambient temperature changes occur will be required. That is with unbalanced transducers as ambient temperature drifts, a false error signal may be created across the bridge when in fact there is no flow of the fluid being measured. A circuit for producing stability irrespective of ambient temperature changes is illustrated in FIG. 3. As is therein shown, resistors 76 and 78 are connected across source of potential E+ thus establishing a reference potential at the common point 96 therebetween. Amplifiers 80 and 82 have a reference terminal thereof connected to the common point 96. The other terminal of the amplifiers 80 and 82 are connected through resistors 93 and 94 to the output terminals 58 and 59 of the bridge 18. The output of the amplifier 80 is connected through the resistor 86 to the heater element 40 of the transducer 12 while the output of the amplifier 82 is connected through the resistor 87 to the heater element 44 of the transducer 14. Through the utilization of capacitors 88 and 92 connected across the amplifiers 80 and 82, respectively, the response time of the compensating circuit is made relatively slow as compared to the repetition rate of the power pulses applied from the remainder of the circuit to the heater element 40. Thus when the ambient temperature of the fluid drifts, causing an unbalance in the resistance characteristics of the detector resistors 38 and 42 an error signal is developed with respect to the reference developed across the resistor 78 thus causing power to be applied by the amplifier 80 or 82 to the proper heater element 40 or 44 to bring the bridge back into balance thus maintaining substantially zero temperature stability for ambient temperature changes. As will be recognized by those skilled in the art, only one amplifier may be utilized if desired in many applications, for example, in conjunction with a circuit such as that illustrated in FIG. 2 with extremely accurate results.

Another embodiment of the digital flow-meter is shown in FIG. 4. The same transducer and feedback switching arrangement of FIGS. 1 and 2 is employed. The data from the comparator is received by parallel input registers, shown at 100. The number of registers employed will depend upon the desired resolution of the resulting count. The output of these registers is applied to a digital-to-frequency converter generally indicated by the combination ladder network 104 and element 106. The converter 104/106 accepts a digital word from the registers and converts it to a proportional frequency by the converter 106. The output of the digital-to-frequency converter 104/106 is connected to and controls a monostable multivibrator 108.

When flow takes place, a search pulse from the output of the comparator enters register 100, where it is applied to the digital-to-frequency converter comprised of elements 104 and 106. The converted signal has a frequency which is proportional to the heat dissipation at the transducer that is in turn related to the fluid flow. The frequency generator 106 acts upon this converted signal to produce a train of pulses whose pulse repetition rate is proportional to flow. The generator pulses trigger the monostable multivibrator 108 which multivibrator provides precision pulses. These multivibrator outputs have precision but adjustable pulse widths and their repetition rates are equal to the outputs of the frequency generator 106. The negative output pulses from the multivibrator 108 are fed back through the feedback control providing the necessary precision power pulses to the transducer heating elements in the manner previously described. Each of the negative output pulses is totalized in register 102, and may be applied to any type of known display circuitry (i.e., readout devices, tapes).

FIG. 5 illustrates an embodiment of the invention which should be employed when the transducer outputs have long thermal time constants and thus perform an averaging (filtering) function and produce a slowly varying D.C. differential error voltage with changing flow rate, as opposed to the previously described method of the ramp-comparator.

The circuit of FIG. 5 replaces the comparator of the system in FIG. 1 with a D.C. differenetial amplifier 110 in series with a voltage to pulse rate converter or voltage controlled oscillator (VCO) 112. The slowly varying, essentially D.C. signal from the transducer bridge circuit is applied to the differential input of amplifier 110. The output of the amplifier 110 drives the VCO 112, which VCO produces a train of pulses 113. The repetition rate of the pulses is proportional to the magnitude of the transducer output voltage. The pulses trigger a monostable multivibrator 22 which as mentioned previously controls the necessary precision power pulses to the transducer through the feedback control circuit to restore the bridge to a balanced condition. Thus for a given flow rate the circuit will stabilize at a specific pulse rate depending upon the pulse width and peak power in each pulse.

Figure 6:
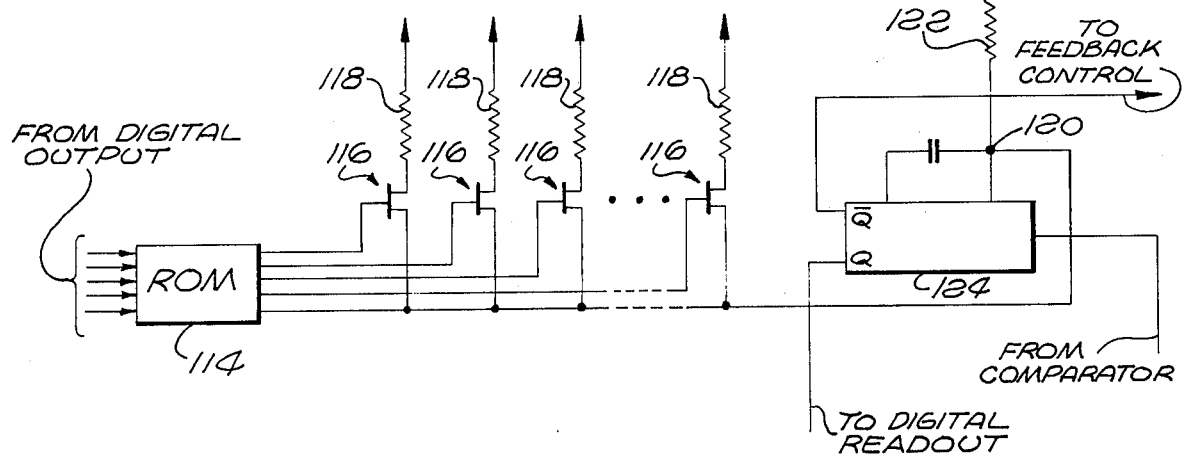
FIG. 6 is a partial block diagram of still another embodiment of the digital flow-meter for providing a linear output during non-linear behavior of the medium to be measured.

In the application of the present invention, the output signals of the flow-meter may not be linear with respect to the fluid velocity in the conduit. The flowmeter can be digitally controlled to provide a linear output even when the behavior of the medium is non-linear. Conversely, a particular non-linear output may be achieved under linear flow conditions. FIG. 6 represents such an embodiment. In this circuit, the digital output data from the rate counters (not shown) are applied to the input terminals of a read only memory circuit (ROM) 114. A ROM is a pre-programmed storage device out of which digital information can be read. The output of ROM 114 drives a series of field effect transistor switches (FET), each FET controlling a resistor 118. The resistors are arranged in parallel at junction 120 with the resistor 122 of the multivibrator 124. The resistor 122 controls the width of the output pulses from the multivibrator 124.

The read only memory is addressed to compare the rate inputs with the data permanently programmed in the ROM. When the digital information from the rate output is coincidental at one point with the programmed data in the ROM, the output of the ROM 114 will send a command signal to the FETS 116. The FETS 116 will change state independently of each other in accordance with the ROM digital word command. Those resistors which are switched into the circuit of the multivibrator by virtue of their associated FETS changing state will either add or subtract to the resistance in parallel with resistor 122. The multivibrator will thus provide either a wider or narrower pulse width to the digital feedback control circuit. This will cause either a lower or higher frequency to take place for a given flow, hence correcting for the non-linearity at that point or event. The larger the memory of the ROM (number of bit planes), the greater the number of events that can be controlled during flow.

While various embodiments have been disclosed, the present invention is not limited to such embodiments and one skilled in the art will recognize that various modifications or changes can be made within the scope of the invention. For example, a separately energized, complementary heating element can be incorporated in each of the transducer circuits. Hence, each transducer will have two heating elements; one to maintain the transducer at the reference temperature and the other to provide the bias control heat. This arrangement will provide isolation between the two heating element circuit functions.

By reference to FIG. 7, wave forms taken at the output of the bridge circuit and the comparator of the embodiments illustrated in FIGS. 1 and 2 are shown for purposes of further clarification and understanding of the operation of the apparatus constructed in accordance with the principles of the present invention. As is therein shown, a circuit in accordance with FIG. 1 produces an output signal 33 at the conductor 17-19 of the bridge circuit 18 during flow conditions which ramps upwardly as illustrated at 140 until it reaches a threshold at 141. At such point, the comparator produces an output pulse 142 which as above described applies a discrete power pulse to the heating element of the transducer 12. While the discrete power pulse is being applied, the temperature of the detector resistor is increasing thus driving the signal 33 downwardly as shown at 143 below the balance point 145 as shown at 144. For low flow, that is a small amount of fluid passing the transducer or large amounts passing the transducer very slowly, a wave such as that shown for low flow in FIG. 7 is generated. When the flow increases, so that a high flow condition occurs, the ramp becomes steeper as illustrated at 150 and the pulses 152 occur more frequently, as is illustrated in curves C and D of FIG. 7. Referring now to curves E, F, G and H, an illustration of the bridge output and comparator outputs of the circuit of FIG. 2 are given. As is illustrated therein, the curve E illustrates the error voltage from the bridge taken at points 58 and 59. As is therein shown, the error voltage again ramps upwardly as shown at 154 until the threshold point is reached at 156. When the threshold is reached, a comparator output pulse as shown at 157 is generated. The output pulse 157 is utilized as above described to apply power to the heating element 40 through utilization of the switching means 24 and will remain in existence for the entire period of time during which the voltage at points 58-59 of the bridge is decreasing as is shown at 158 at which point the pulse 157 no longer occurs. When flow increases as is shown in wave forms G and H of FIG. 7, the slope of the ramp increases as is shown at 162 until the threshold 163 is reached. Thereafter the output pulse from the comparator is generated and continues for a longer duration as is shown at 164 during which the error voltage is again brought back to its balance point as is shown at 165.

What is claimed is:

1. A digital thermodynamic flowmeter for measuring and counting mass flow rate of a fluid comprising:
   a. first and second temperature-sensitive electrical output transducers disposed in the flow path of said fluid; said first transducer being directly exposed to the main flow path of said fluid, said second transducer being shielded from the direct flow path but disposed to detect the ambient temperature of said fluid;
   b. means for simultaneously maintaining said first and second transducers under reference thermal conditions while said first transducer is exposed to the thermal conditions to be measured, said reference thermal conditions being above fluid ambient temperature, said means having an input and an output;
   c. means for detecting the magnitude of any deviation from reference condition of said first transducer with respect to said second transducer in response to said fluid flowing past said first transducer and removing heat therefrom and providing an output signal responsive thereto;
   d. means for initiating a discrete electrical power pulse responsive to said output signal from said means for detecting said deviation, said power pulse having a constant width for varying flow rates;
   e. means for applying said discrete power pulse to said first transducer, said discrete power pulse having sufficient power to return said transducer to said thermal reference condition irrespective of the volume of fluid flowing thereby;
   f. counting means responsive to said output signal to reproduce a digital signal proportional to said mass flow; and
   g. display means connected to said counting means for displaying the resulting counts.

2. The invention as set forth in claim 1 wherein said first and second transducers each comprise a temperature-sensitive resistor in proximity to a heating element.

3. The invention as set forth in claim 1 wherein feedback means includes a switch means.

4. A digital flow-meter for measuring and counting instantaneous and accumulated mass flow rate of a fluid comprising:
   a. a first transducer disposed directly in the fluid flow and comprising a heating element in proximity to a temperature sensitive resistor for maintaining said temperature sensitive resistor at a fixed temperature above the ambient temperature of the medium so that an increase in fluid flow causes a transfer of heat to the fluid from the temperature sensitive resistor thereby resulting in an increase or decrease in said temperature-sensitive resistor resistance;
   b. a second transducer disposed in the conduit in a manner to be sensitive to fluid temperature but insensitive to the flow of the fluid and comprising:
      a temperature-sensitive resistor;
      a heating element in proximity to said temperature sensitive resistor for maintaining said temperature-sensitive resistor at a fixed temperature above the ambient temperature of the fluid in the conduit;
   c. a normally balanced bridge circuit including said temperature-sensitive resistors of said first and second transducers;
   d. a comparator connected to the output of said normally balanced bridge circuit for comparing the unbalanced signal of the normally balanced bridge circuit caused by said resistance change of said temperature-sensitive resistor of said first transducer during fluid flow, with respect to said impedance of said temperature-sensitive resistor of second transducer, the output of said comparator changing states when the magnitude of the unbalanced signal reaches a predetermined level;

e. a multivibrator triggered by the output change of state of said comparator and thereby providing a precision width output pulse;

f. means for counting and registering the instantaneous and total accumulated pulse from the pulse output of the multivibrator; and g. a feedback control circuit including a switching transistor which when energized by the output pulses of the multivibrator provides discrete power pulses to said heating element of said first transducer to heat its associated temperature-sensitive resistor, each said power pulse causing the impedance of said temperature-sensitive resistor of said first transducer to increase or decrease by an amount sufficient to cause the resulting voltage across said resistor to balance said normally balanced bridge thereby causing the detecting means output to return to its original state.

5. The invention as set forth in claim 4 which further includes:

a. a permanently programmed read only memory having an input connected to the means for counting and registering the instantaneous pulse rate and an output for providing a command signal;

b. switching means having an input for receiving the read only command signal and an output connected to the multivibrator in such a manner as to increase or decrease the output pulse width of the multivibrator in response to the command signal.

* * * * *